United States Patent
Rowell

(10) Patent No.: US 7,717,244 B2
(45) Date of Patent: May 18, 2010

(54) REPLACEMENT TORQUE CONVERTER COVER ASSEMBLY

(75) Inventor: Brian G. Rowell, Saxtons River, VT (US)

(73) Assignee: Sonnax Industries, Inc., Bellows Falls, VT (US)

( * ) Notice: Subject to any disclaimer, the term of this patent is extended or adjusted under 35 U.S.C. 154(b) by 526 days.

(21) Appl. No.: 11/893,330

(22) Filed: Aug. 15, 2007

(65) Prior Publication Data

US 2008/0041685 A1 Feb. 21, 2008

Related U.S. Application Data

(60) Provisional application No. 60/837,762, filed on Aug. 15, 2006.

(51) Int. Cl.
*F16H 45/02* (2006.01)
*B21K 1/26* (2006.01)
(52) U.S. Cl. .................. 192/3.29; 29/401.1; 192/112
(58) Field of Classification Search .............. 192/70.16
See application file for complete search history.

(56) References Cited

U.S. PATENT DOCUMENTS

| | | | | |
|---|---|---|---|---|
| 3,338,358 A | * | 8/1967 | Christenson et al. ......... 192/3.3 |
| 3,734,251 A | * | 5/1973 | Annis et al. .................. 192/3.3 |
| 6,216,837 B1 | * | 4/2001 | Maienschein et al. ....... 192/3.29 |
| 6,327,766 B1 | * | 12/2001 | Cardente ................. 29/402.01 |
| 7,296,666 B1 | * | 11/2007 | Morin ....................... 192/3.28 |
| 2006/0016661 A1 | * | 1/2006 | George et al. ............... 192/112 |
| 2006/0185955 A1 | * | 8/2006 | Fukunaga et al. .......... 192/3.29 |

* cited by examiner

*Primary Examiner*—Rodney H Bonck
(74) *Attorney, Agent, or Firm*—Downs Rachlin Martin PLLC; Clifford F. Rey, Esq.

(57) ABSTRACT

A replacement torque converter cover designed to withstand mechanical stresses generated in the torque converter lock-up clutch of ALLISON transmissions when such transmissions are utilized with diesel engines and other high-torque truck engines. The original equipment cover includes through-drilled holes for receiving unitary threaded stud pins, which function to attach the cover to the engine crankshaft externally and to drive the lock-up clutch piston internally during operation. The present replacement cover provides a lock-up clutch piston interface wherein such through-drilled holes and unitary threaded stud pins are eliminated, which substantially reduces stress concentration and mechanical fatigue in the replacement cover. In comparison to the unitary threaded stud pins of the original equipment cover, the present replacement cover provides separate threaded stud and drive pin components respectively, which are installed at radially offset positions on opposite sides of a modified radial wall having an increased axial thickness and improved durability.

16 Claims, 6 Drawing Sheets

REPLACEMENT TORQUE CONVERTER COVER ASSEMBLY

CROSS-REFERENCE TO RELATED APPLICATION

This application claims the benefit under 35 U.S.C. §119 (e) of U.S. Provisional Patent Application No. 60/837,762 filed Aug. 15, 2006, entitled Replacement Torque Converter Cover Assembly.

BACKGROUND OF INVENTION

The present invention relates to automotive transmission systems and, more particularly, to a replacement torque converter cover for an ALLISON MT 600 series (hereinafter "ALLISON") transmission or other similar transmissions.

The torque converter of an automatic transmission replaces the clutch used in manual transmissions. It is the primary component for transmittal of power between the engine and the transmission in an automotive vehicle. The basic principle of torque converter operation can be observed by placing the blades of two electric fans opposite each other and turning on one of the fans. If one of the fans is turned on, the force of the air column produced will act upon the motionless blades of the other fan, which will begin turning and eventually reach a speed approaching the speed of the powered fan. The torque converter employs an analogous mechanism using automatic transmission fluid (hereinafter "ATF") to provide a fluid coupling between the engine and the transmission of an automobile, which provides for a smooth conversion of torque from the engine to the mechanical components of the transmission.

In the ALLISON transmissions a drum-shaped, torque converter cover is connected by threaded studs to the engine flywheel at its forward end and is also bolted to the torque converter impeller (hereinafter "impeller") so that the impeller will rotate at engine speed. It is known in the industry that when such ALLISON transmissions are installed in commercial duty vehicles having a high torque, diesel engine such as trucks, buses, equipment haulers, and tractors, the structural strength of the original equipment manufacture (hereinafter "OEM") torque converter cover is often inadequate and, as a result, failure of the cover often occurs during converter lock-up and other peak torque events.

In addition, such commercial vehicles are often permitted to run at idle for extended periods of time. Because such diesel engines run unevenly at low speeds, mechanical fretting of torque converter components may result in structural damage. This is a particular problem in vehicles with the ALLISON MT 600 transmission wherein the lock-up clutch in the torque converter lacks a dampening mechanism, which results in high impact loads being imparted to the torque converter cover studs.

Thus, the present invention has been developed to resolve this problem and other shortcomings of the prior art.

SUMMARY OF THE INVENTION

Accordingly, the present invention is a replacement torque converter cover (hereinafter "replacement cover") for an ALLISON MT 600 transmission or other similar transmission. The present replacement cover is designed to withstand the mechanical stresses generated in the torque converter lock-up clutch during peak torque events when such transmissions are utilized with diesel engines and other high-torque truck engines.

The OEM cover includes through-drilled holes for receiving threaded stud pins, which function to attach the cover to the engine flexplate externally and to continuously drive the clutch piston internally during all modes of operation. The present replacement cover provides a redesigned lock-up clutch interface (i.e. piston contact surface) wherein such through-drilled holes for receiving threaded stud pins are eliminated. Any such discontinuity (i.e. through-drilled hole) in a machine part alters the stress distribution in the vicinity of the discontinuity and is prone to stress cracking. Accordingly, stress concentration and mechanical fatigue in the present replacement cover is substantially reduced.

The present replacement cover also provides increased structural strength having a piston contact (i.e. working) surface of an increased axial thickness. The present replacement cover provides separate threaded studs and stud pin components for installation on the opposite sides of such piston working surface for engagement with the OEM flexplate and clutch piston respectively.

There has thus been outlined, rather broadly, the important features of the invention in order that the detailed description thereof that follows may be better understood, and in order that the present contribution to the art may be better appreciated. There are additional features of the invention that will be described hereinafter and which will form the subject matter of the claims appended hereto.

Those skilled in the art will appreciate that the conception upon which this disclosure is based may readily be utilized as a basis for the designing of other structures, methods, and systems for carrying out the purposes of the present invention. It is important, therefore, that the claims be regarded as including such equivalent constructions insofar as they do not depart from the spirit and scope of the present invention.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

Figure 1:
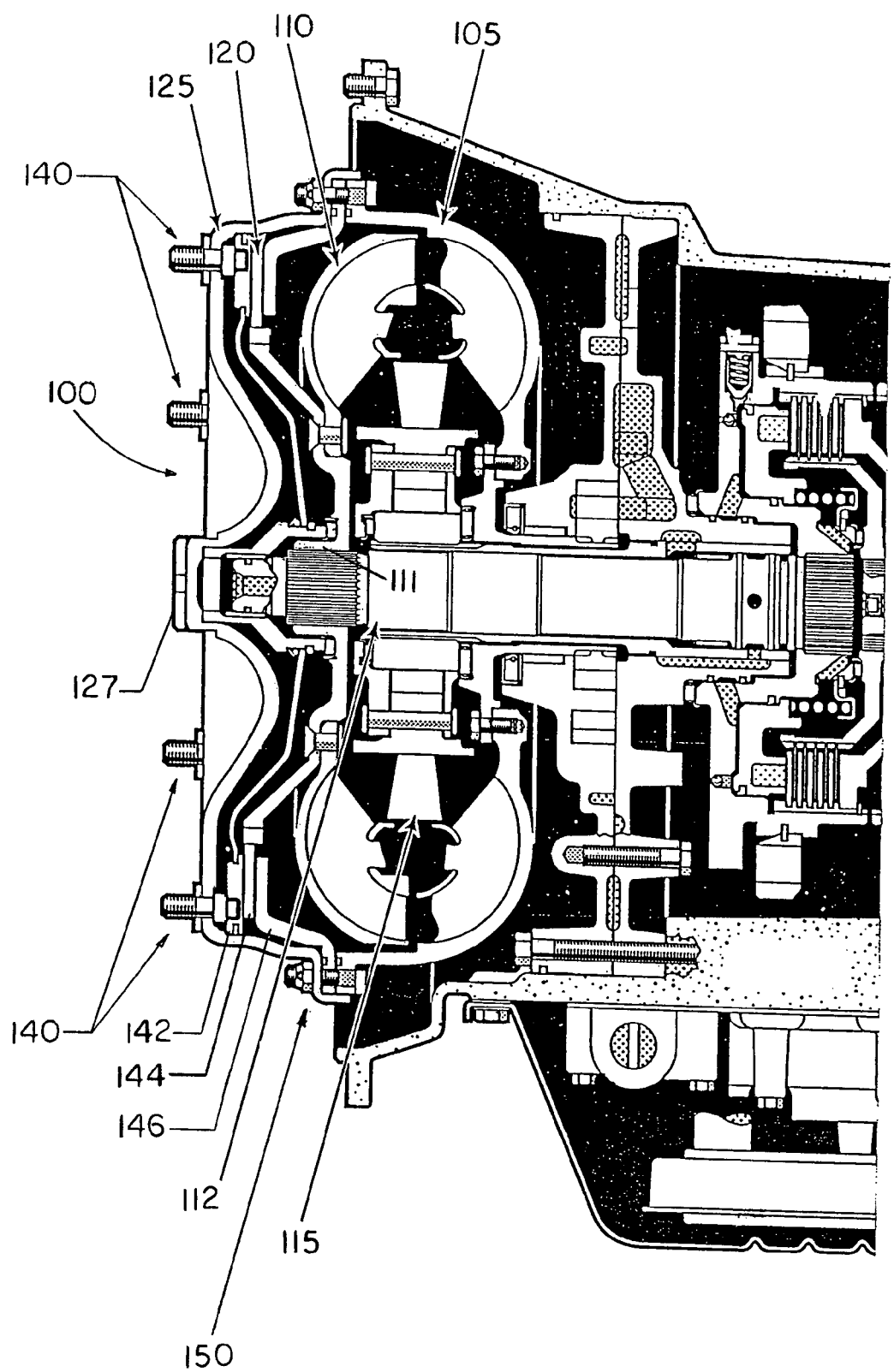
FIG. 1 is a longitudinal cross-section view of an ALLISON MT 600 torque converter assembly illustrating the internal components thereof and is labeled Prior Art.

Prior to describing the present invention in detail, it may be beneficial to briefly review the structure and function of the OEM torque converter assembly of an ALLISON MT 600 transmission wherein the present invention is utilized. With further reference to the drawings there is shown therein a cross-sectional view of such a torque converter assembly, indicated generally at 100 and illustrated in FIG. 1, which is the primary component for transmittal of power between the engine and the automatic transmission in an automotive vehicle. The torque converter assembly 100 provides for a smooth conversion of torque from the engine to the mechanical components of the automatic transmission and also functions to multiply torque from the engine enabling the vehicle to achieve additional performance when necessary.

Torque converter assembly 100 is comprised of the following main sub-assemblies: (1) an impeller assembly, indicated generally at 105, which is the driving member; (2) a turbine assembly, indicated generally at 110, which is the driven member; (3) a stator assembly, indicated generally at 115, (4) a lock-up clutch assembly, indicated generally at 120, which engages the turbine assembly 110 to enable direct mechanical drive; and (5) a front cover assembly (hereinafter "cover"), indicated generally at 125, which is attached to the impeller assembly 105 as at 150.

Cover 125 is also attached to the engine flexplate (not shown) by threaded stud pins 140 that are mechanically attached to the engine flexplate so that the cover 125 will rotate at engine speed. Cover 125 includes a cover pilot 127 on a forward-facing surface thereof to center the torque converter assembly 100 in coaxial relation to the engine crankshaft (not shown).

When the engine is running, the impeller assembly 105 acts as a centrifugal pump by picking up ATF at its center and discharging it at its rim. The force of the ATF flow from the impeller assembly 105 is directed into the turbine assembly 110 and causes it to rotate. As the engine and impeller assembly 105 increase in speed, so does the turbine assembly 110 including turbine shaft 112 to mechanically operate the transmission.

Figure 2:
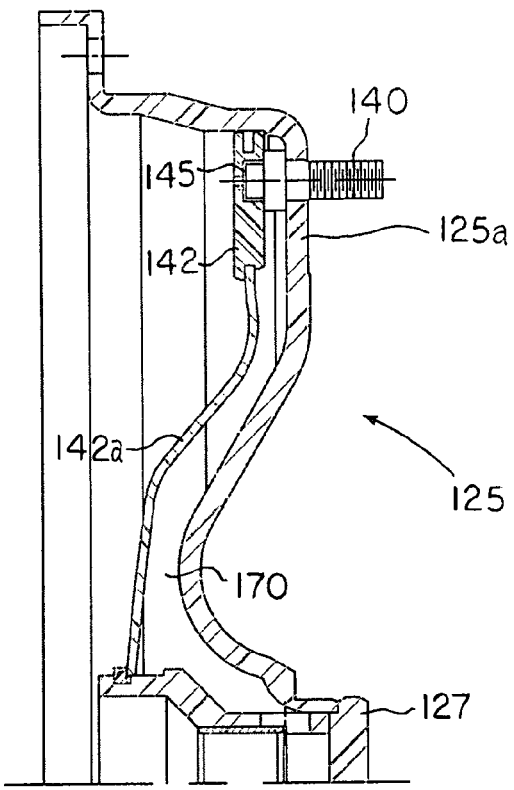
FIG. 2 is a partial longitudinal cross-section view of the ALLISON MT 600 torque converter assembly and is labeled Prior Art.
Figure 3:
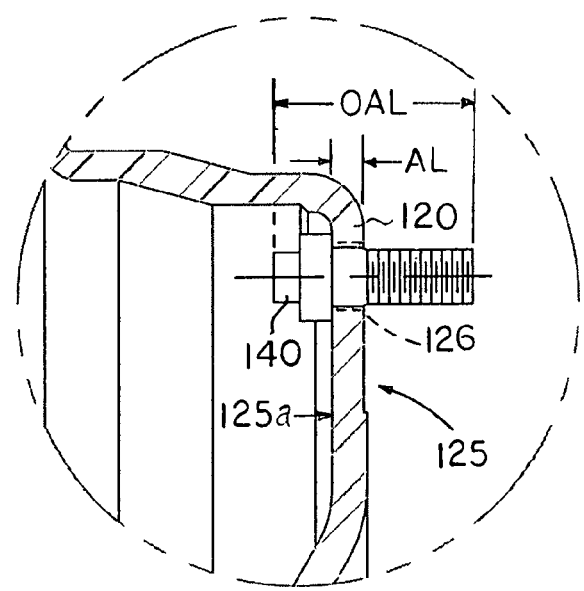
FIG. 3 is an enlarged, partial longitudinal cross-section view of the ALLISON MT 600 torque converter assembly and is labeled Prior Art.

The lock-up clutch assembly 120 includes a lock-up piston 142 having a plurality of pin receptacles 145 (FIG. 2) formed within a forward facing surface thereof for engagement with the mating stud pins 140 extending through holes 126 which are drilled through the radial wall 125a of cover 125 as most clearly shown in FIG. 3. The lock-up clutch assembly 120 also includes a circular friction plate 144 for frictional engagement with a concentrically disposed backing plate 146. Lock-up piston 142 is also mechanically attached to the turbine hub 111 (FIG. 1).

When lock-up is required the contact surface of lock-up piston 142 flexes axially rearward in response to increased ATF pressure within lock-up clutch 120. Axial flexion of piston 142 is guided by pins 140 within mating receptacles 145 of piston 142 compressing friction plate 144 against backing plate 146 (FIG. 1) to provide a direct mechanical coupling of the engine to the transmission during the torque converter lock-up cycle. When the lock-up clutch assembly 120 is applied, the slippage that occurs through the fluid coupling is eliminated providing a direct mechanical drive path from the engine to the transmission.

More particularly, when the lock-up piston 142 is installed within the cover 125 as most clearly shown in FIG. 2, a clutch apply chamber 170 is formed between the cover 125 and the piston 142. When fluid pressure in the clutch apply chamber 170 exceeds the spring preload force of the piston web 142a, the contact surface of piston 142 is flexed axially rearward compressing the friction plate 144 between piston 142 and backing plate 146 (FIG. 1) to initiate the lock-up cycle.

When converter lock-up is no longer required, a port opens that allows pressurized ATF to flow out of the clutch apply chamber 170 thereby releasing the lock-up piston 142 which is flexed in the reverse direction to end the lock-up cycle.

It is known in the industry that when the ALLISON transmissions are utilized with a high-torque, diesel engine, the structural strength of the OEM cover 125 is inadequate and, as a result, structural failure of the cover often occurs. Such structural failure is due in substantial part to the presence of the through-drilled holes 126 (FIG. 3) formed in the OEM cover 125 and weldment of the threaded stud pins 140 in position within such holes 126 to attach the cover 125 to the engine flexplate. Any such discontinuity (e.g. through-drilled holes 126) in a machine part alters the stress distribution in the vicinity of the discontinuity and is prone to stress fractures or cracks. Such discontinuities are called stress raisers, and the portions of the part in which they occur are called areas of stress concentration.

The rotational torque force and mechanical stress imposed on the OEM cover 125 at engine idle and other peak torque events produces stress fractures in the cover in proximity to holes 126 and adjacent to stud pins 140, which are attached to cover 125 by weldment. Once a crack is initiated, the stress concentration effect becomes greater and the cracks progress more rapidly, which results in ATF leakage from the apply chamber 170. As the stress increases in magnitude, that portion of the radial wall 125a in proximity to holes 126 fails, which results in excessive ATF leakage and malfunction of the hydraulic system.

Further, the necessary clearance between stud pins 140 and pin receptacles 145 permits rotational oscillation of the piston 142 against the stud pins 140 imparting high impact loads to the stud pins. The effect of such impact against stud pins 140 is exacerbated due to the fact that the ALLISON MT 600 transmission lacks a dampening mechanism to counteract such high impact loads. Eventually stud pins 140 become loosened and are dislodged from cover 125 causing malfunction of the lock-up clutch 120.

Figure 4:
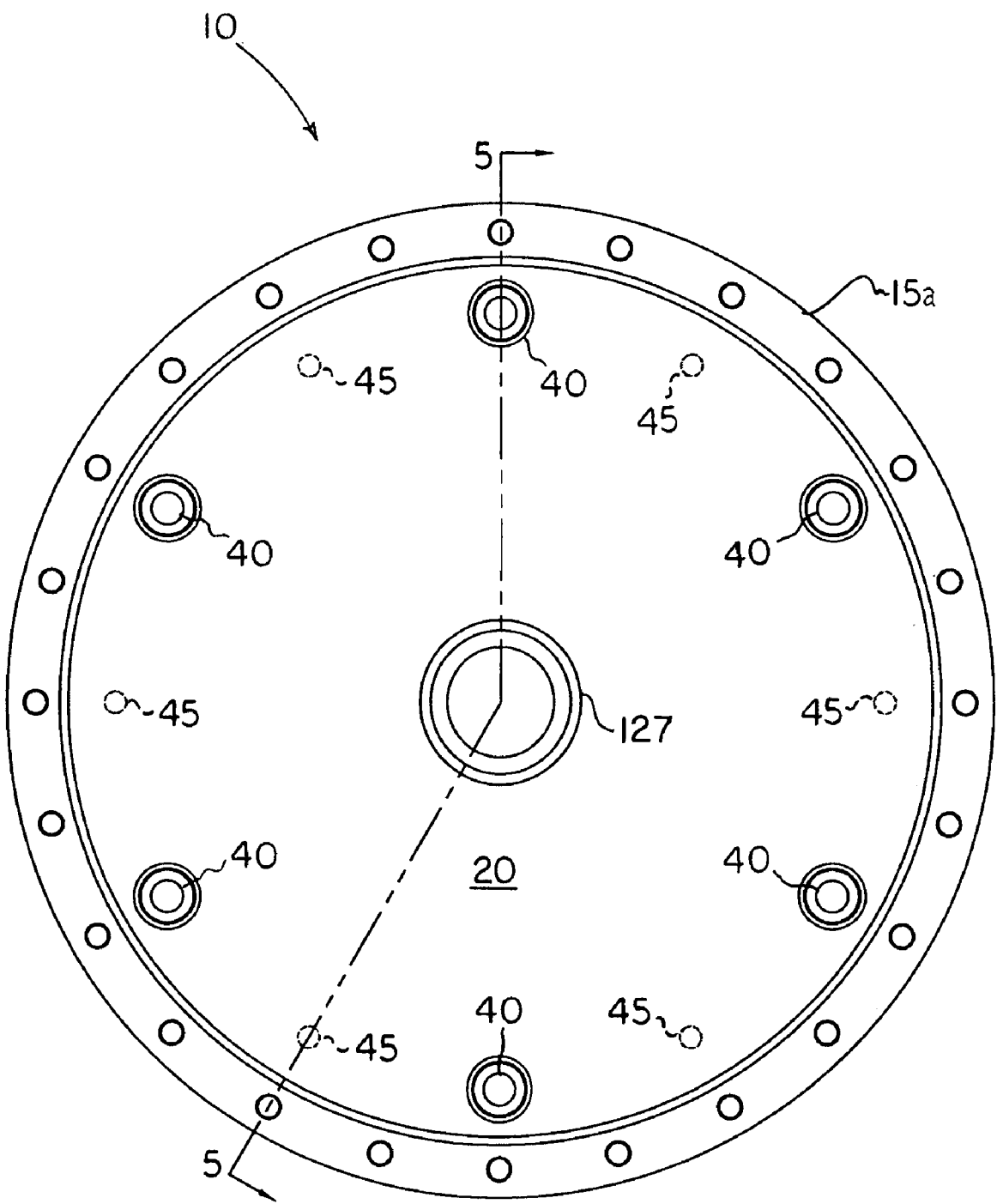
FIG. 4 is a top plan view of the replacement torque converter cover assembly of the present invention.
Figure 5:
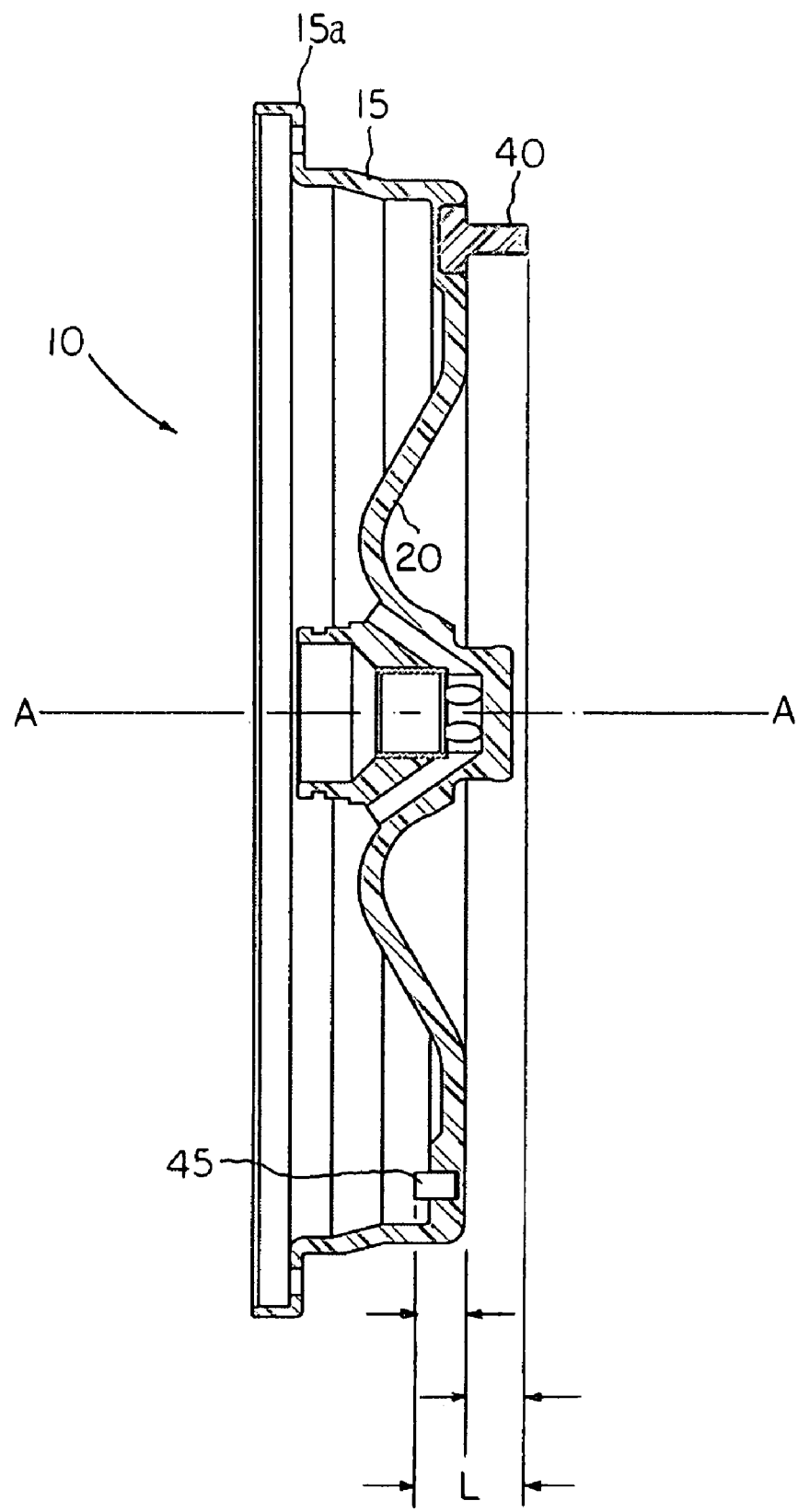
FIG. 5 is a longitudinal cross-section taken along section line 5-5 of FIG. 4.

Thus, the present invention has been developed to resolve this problem and other shortcomings of the prior art and will now be described. Referring to FIGS. 4 and 5 there is shown therein a replacement cover assembly in accordance with the present invention, indicated generally at 10. The present replacement cover 10 is machined from a high grade steel forging in accordance with American Iron and Steel Institute (AISI 1026) or other suitable material.

Replacement cover 10 comprises a drum-shaped member having a radial wall 20 extending in generally perpendicular relation to the longitudinal axis -A- (FIG. 5). An integral cylindrical portion 15 including flange 15a of the cover 10 extends axially from the radial wall 20 in concentric relation to axis -A-.

In the embodiment shown the present cover 10 includes a set of six threaded studs 40 installed in a concentric array at angular intervals of 60 degrees on a forward-facing surface of the cover (FIG. 4). In addition, the present cover 10 includes a set of six drive pins 45 also installed in a concentric array at angular intervals of sixty degrees on an opposite, rearward-facing surface of the cover 10. In the preferred embodiment both threaded studs 40 and drive pins 45 are fabricated from high quality steel or other suitable material for this purpose.

Figure 6A:
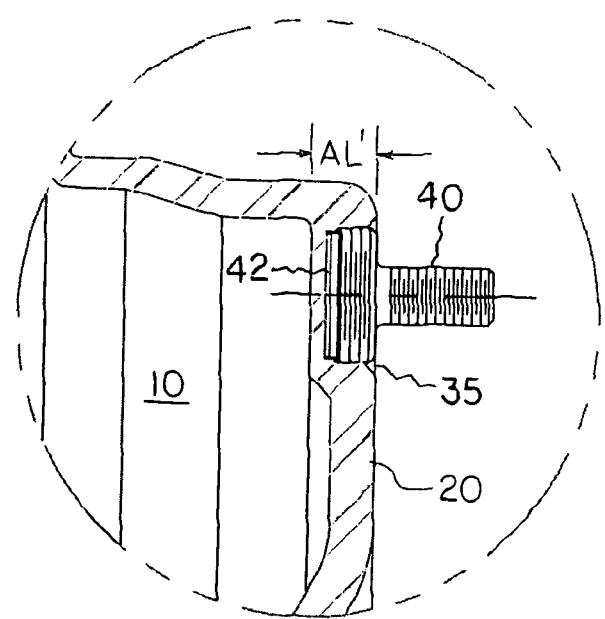
FIG. 6A is an enlarged detail view showing a threaded stud of the present invention installed in the present replacement cover.

Still referring to FIG. 4 it can be seen that the array of six drive pins 45 is oriented at a thirty degree angular offset to the array of threaded studs 40 such that each drive pin 45 is equidistant from each threaded stud 40. More particularly, in the present invention each threaded stud 40 is installed in a mating threaded hole 42 as shown in FIG. 6A and after threaded engagement therein is permanently captured by weldment at the base of studs 40. Thereafter, each remaining weld bead is ground flush with a forward-facing surface of radial wall 20 as at 35 (FIG. 6A).

Figure 6B:
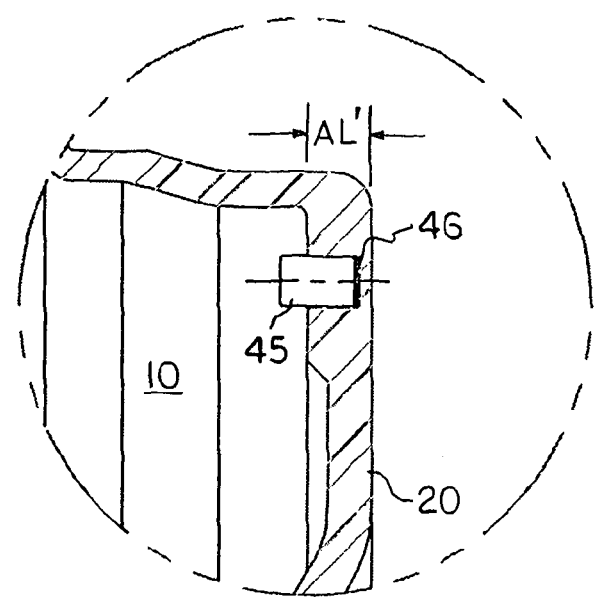
FIG. 6B is an enlarged detail view showing a drive pin of the present invention installed in the present replacement cover.
Figure 7:
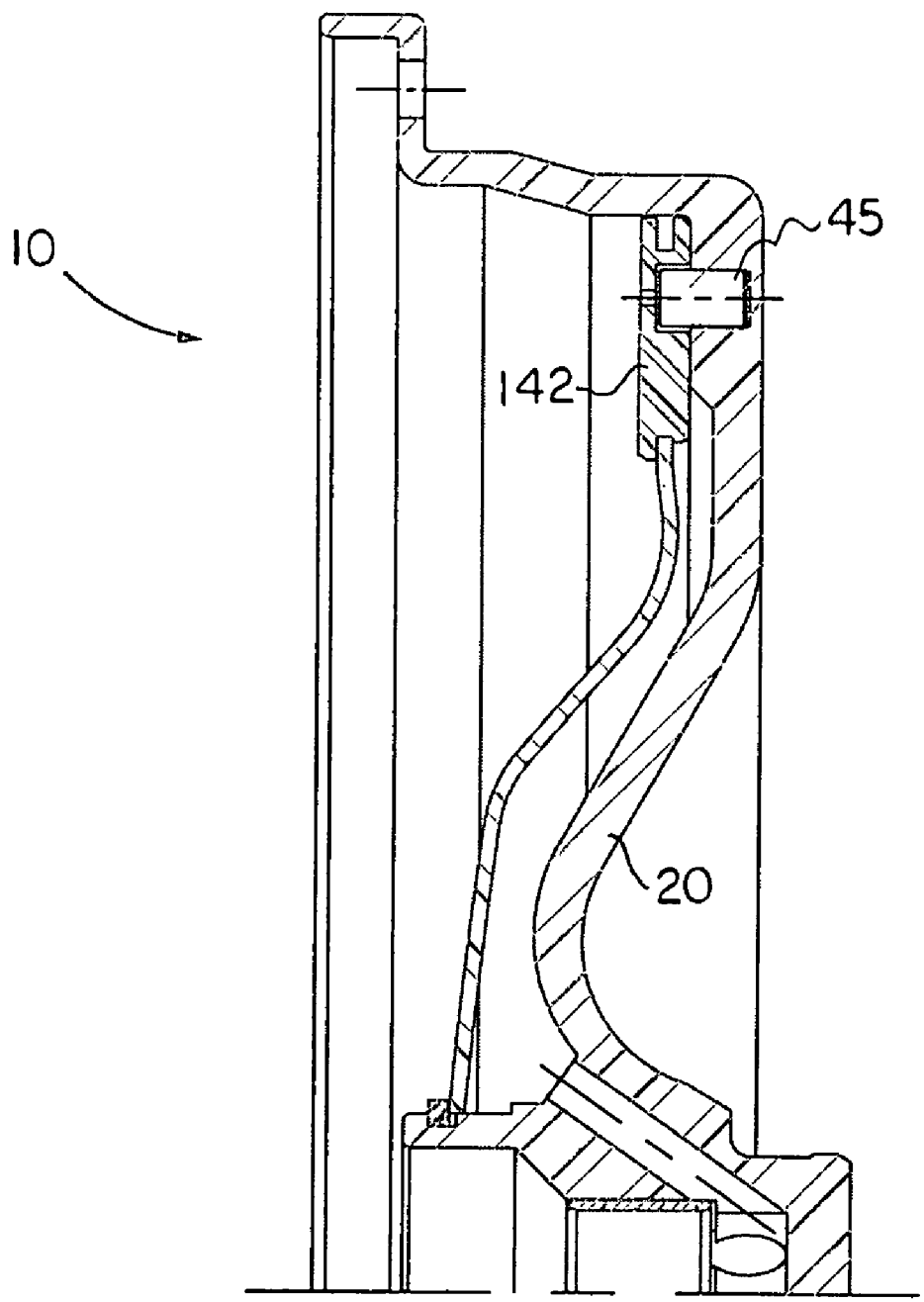
FIG. 7 is a partial longitudinal cross-section of the present replacement cover showing a drive pin in engagement with the OEM lock-up piston.

Referring to FIG. 6B each drive pin 45 is installed to an interference fit within a blind hole 46 formed on the inner surface of radial wall 20 of cover 10 to a predetermined depth corresponding to an axial stack-up length -L- (FIG. 5) for threaded stud 40 and drive pin 45 assembled in cover 10. It will be noted that the axial stack-up length -L- is equivalent to the overall length -OAL- (FIG. 3) of OEM stud pins 145. Such axial stack-up length -L- is critical for maintaining the functional position of the lock-up clutch assembly 120 during normal operation of the transmission.

It will also be noted that the axial length (i.e. thickness) -AL'- of the present radial wall 20 (FIGS. 6A and 6B) has been substantially increased in comparison to the axial length (i.e. thickness) -AL- of the radial wall 125a of the OEM cover 125 (FIG. 3) to provide added structural strength and durability to the present replacement cover 10.

Although not specifically illustrated in the drawings, it should be understood that additional equipment and structural components will be provided as necessary and that all of the components described above are arranged and supported in an appropriate fashion to form a complete and operative Replacement Torque Converter Cover Assembly incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

Having described preferred embodiments of our invention, what we desire to secure by U.S. Letters Patent is:

We claim:

1. A replacement torque converter cover for replacement of an original equipment torque converter cover within an automatic transmission of a land vehicle, wherein said original equipment torque converter cover includes a drum-shaped member having a longitudinal axis, an integral radial wall disposed in perpendicular relation to said axis, wherein an inner surface of said radial wall comprises a clutch piston interface, a plurality of original equipment threaded studs having integral drive pins, wherein said threaded studs are installed in through-drilled holes formed in said radial wall to attach said cover to an engine flexplate externally thereof, wherein said integral drive pins engage a clutch piston internally of said cover, wherein said clutch piston is a component of a lock-up clutch assembly installed within said cover, wherein said replacement torque converter cover comprises:

a replacement drum-shaped member including a modified radial wall having an inner surface and an outer surface, wherein said inner surface of said modified radial wall includes an array of blind holes formed therein at regular angular intervals, wherein said outer surface of said modified radial wall includes an array of blind threaded holes at regular angular intervals, said array of blind threaded holes being radially oriented at a predetermined angular offset to said array of blind holes;

a plurality of replacement threaded studs engaged within said blind threaded holes; and a plurality of replacement drive pins disposed within said blind holes, wherein said plurality of replacement drive pins are positioned for engagement within mating receptacles formed in said clutch piston.

2. A replacement torque converter of claim 1 wherein said regular angular intervals corresponding to said array of blind holes is sixty degrees.

3. A replacement torque converter of claim 1 wherein said regular angular intervals corresponding to said array of threaded blind holes is sixty degrees.

4. A replacement torque converter of claim 1 wherein said predetermined angular offset between said array of blind threaded holes and said array of blind holes is thirty degrees.

5. A replacement torque converter of claim 1 wherein a combined axial length of said replacement threaded studs and said replacement drive pins is equivalent to an overall length of said original equipment threaded studs including said integral drive pins.

6. A replacement torque converter of claim 1 wherein an axial thickness of said modified radial wall of said replacement drum-shaped member is substantially increased in comparison to said radial wall of said original equipment torque converter cover to provide increased structural strength.

7. A replacement torque converter of claim 1 wherein said plurality of replacement threaded studs engaged within said blind threaded holes are permanently captured therein by weldment.

8. An improved torque converter cover for replacement of an original equipment torque converter cover within an automatic transmission of a land vehicle, wherein said original equipment torque converter cover includes a drum-shaped member having a longitudinal axis, an integral radial wall disposed in perpendicular relation to said axis, wherein an inner surface of said radial wall comprises a clutch piston interface, a plurality of original equipment threaded studs including integral drive pins, wherein said threaded studs are installed in through-drilled holes formed in said radial wall to attach said cover to an engine flexplate externally thereof, wherein said integral drive pins engage a clutch piston internally of said cover, wherein said clutch piston is a component of a lock-up clutch assembly installed within said cover, wherein the improvements comprise:

a replacement drum-shaped member including a modified radial wall having an inner surface and an outer surface, wherein said inner surface of said modified radial wall includes an array of blind holes formed therein at regular angular intervals, wherein said outer surface of said modified radial wall includes an array of blind threaded holes at regular angular intervals, said array of blind threaded holes being radially oriented at a predetermined angular offset to said array of blind holes.

9. The improved torque converter cover of claim 8 wherein a plurality of replacement threaded studs are engaged within said array of blind threaded holes.

10. The improved torque converter cover of claim 9 wherein a plurality of replacement drive pins are disposed within said array of blind holes.

11. The improved torque converter of claim 9 wherein said plurality of replacement threaded studs engaged within said blind threaded holes are permanently captured therein by weldment.

12. The improved torque converter cover of claim 8 wherein said regular angular interval corresponding to said array of blind holes is sixty degrees.

13. The improved torque converter cover of claim 12 wherein said regular angular interval corresponding to said array of threaded blind holes is sixty degrees.

14. The improved torque converter cover of claim 13 wherein said predetermined angular offset between said array of blind threaded holes and said array of blind holes is thirty degrees.

15. The improved torque converter cover of claim 8 wherein a combined axial length of said replacement threaded studs and said replacement drive pins is equivalent to an overall length of said original equipment threaded studs including said integral drive pins.

16. The improved torque converter of claim 8 wherein an axial thickness of said modified radial wall of said replacement drum-shaped member is substantially increased in comparison to said radial wall of said original equipment torque converter cover to provide increased structural strength.

* * * * *